Feb. 13, 1962

A. K. SPALDING 3,020,720

METHOD AND MEANS FOR PRODUCING HYDRAULIC VIBRATIONS

Filed Feb. 20, 1957

INVENTOR.
A. K. Spalding
BY
ATTORNEY C. M. McKnight

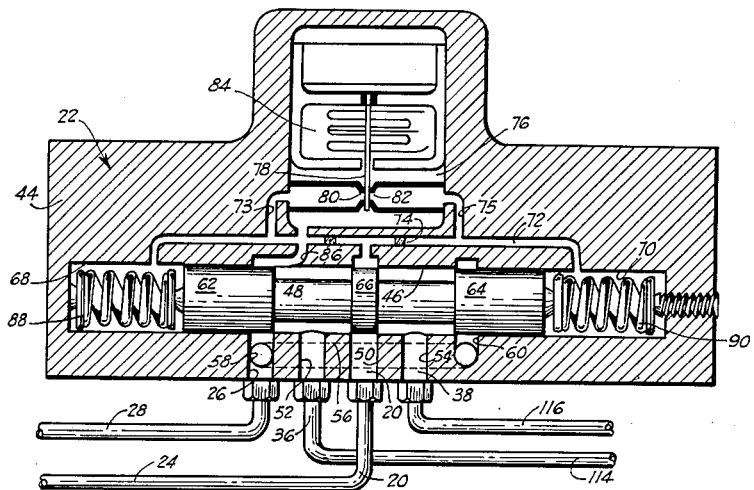
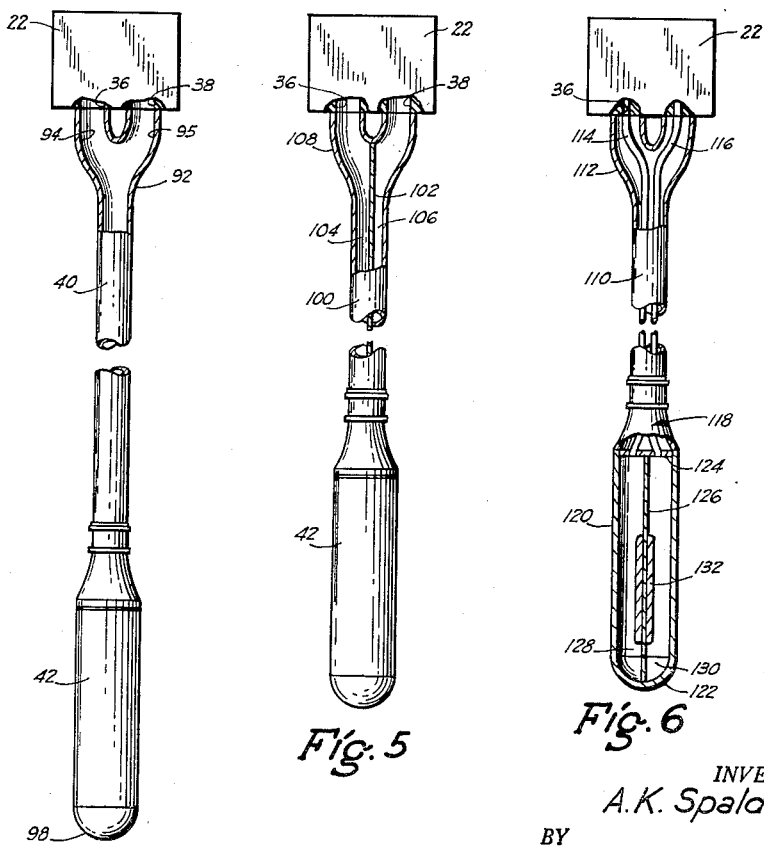

United States Patent Office 3,020,720
Patented Feb. 13, 1962

3,020,720
METHOD AND MEANS FOR PRODUCING
HYDRAULIC VIBRATIONS
Albert K. Spalding, 4240 Arcady St., Dallas, Tex.
Filed Feb. 20, 1957, Ser. No. 641,289
7 Claims. (Cl. 60—54.5)

This invention relates to improvements in vibrating apparatus, and more particularly, but not by way of limitation, to an apparatus for hydraulically producing pulsations or vibrations in a conduit and vibrating head member for any purpose wherein vibrations are required, such as in concrete being placed, feed hoppers, material bins, cars, tables, sand and gravel sifting screens, fracturing the oil bearing strata of oil well bores, and the like.

Concrete poured into a form must be carefully and thoroughly compacted before a hardening thereof in order to avoid air holes or pockets around any structural members or re-enforcing bars which are often used in such types of construction. The working or tamping of the concrete poured into large flat molds such as used in a floor or highway construction needs to be varied to produce best results. Many types of tubular vibrating devices have been designed which are adapted for insertion into the poured concrete for vibration thereof to thoroughly compact the concrete within the form and eliminate air pockets and the like within the finished concrete structure. Such vibrating equipment usually comprises a tubular vibrating head member secured to the outer extremity of a hose or conduit. The vibrating head member is often provided with a reciprocable piston member or eccentric rotating member therein to impart a vibration to the head. An electric or fluid motor is usually provided in the head member, or in the proximity thereof, for reciprocation or rotation of the movable member within the head. The fluid type of motor is adapted to respond to the flow of fluid through the conduit for actuation of the motor and movable member to create vibrations for the head member itself. It will be apparent that the vibrating head members thus designed are usually quite complicated and expensive in construction and maintenance.

The present invention contemplates a novel vibrating apparatus so designed and constructed that the rotating parts of the vibrating head are eliminated. The present invention provides an unique application of hydraulic pressure for transmitting vibrations to both the conduit member and the vibrating head in order to increase the vibrating efficiency of the apparatus. Motor or piston members are not necessary in the vibrating head member in order to provide vibrations thereof, and the vibrations are created entirely through hydraulic impulses imparted through a fluid column. The conduit member and vibrating head are filled with a hydraulic fluid to establish a substantially static condition therein. Hydraulic pressure is applied to the fluid column, and the impulse is transmitted therealong to provide a vibration of the conduit and head member. The vibrating conduit cooperates with the hydraulic impulses in the fluid column to cause a vibration of the fluid filled head member. Thus, vibrations may be created not only in the vibrating head, but also throughout the length of the conduit.

The hydraulic pressure impulses applied to the fluid column are controlled through a servo valve member which intermittently discharges hydraulic fluid into contact with the fluid column. The servo valve may be oscillated at substantially any desired frequency by an electric oscillator member which may be set or suitably adjusted to deliver the desired frequency in the conduit and vibrating head member. The intermittent discharge of hydraulic fluid from the servo valve is transmitted into impulses in the column to create a vibration of the conduit and head member. It will be apparent that the novel hydraulic vibrating apparatus may be utilized for many purposes wherein vibrations are required, such as for shaking feed hoppers and the like, or for producing vibrations for an earth compaction machine or roller, earth strata fracturing, gravel and sand sifting machines, and producing vibration for cars during unloading.

It is an important object of this invention to provide a novel vibrating apparatus wherein impulses are imparted to a fluid column for providing vibrations in a conduit and vibrating head member.

It is another object of this invention to provide a novel hydraulic vibrating apparatus wherein the vibration impulses may be regulated or controlled in a manner to provide for predetermined frequencies of vibration for a vibrating conduit and head member.

Another object of this invention is to provide a hydraulic vibrating apparatus so designed and constructed that substantially all the rotating parts are eliminated in the vibrating head member.

A further object of this invention is to provide a hydraulic vibrating apparatus which may be constructed or arranged as either a portable unit or a permanent installation.

It is still another object of this invention to provide a hydraulic vibrating apparatus which eliminates an expensive electric motor or eccentric rotor apparatus usually required in the vibrating head for producing vibrations therein.

And still another object of this invention is to provide a hydraulic vibrating apparatus which is economical and durable in construction and simple and efficient in operation.

Other objects and advantages of the invention will be evident from the following detailed description, read in conjunction with the accompanying drawings, which illustrate my invention.

In the drawings:

FIGURE 3 is a sectional elevational view of a servo valve member which may be utilized in the invention.

FIGURE 4 is an elevational view partly in section of the conduit and vibrating head members of the invention.

FIGURE 5 is an elevational view partly in section of a modified conduit and vibrating head member of the invention.

FIGURE 6 is a view similar to FIGS. 4 and 5 depicting still another embodiment of the conduit and vibrating head member.

Figure 1:
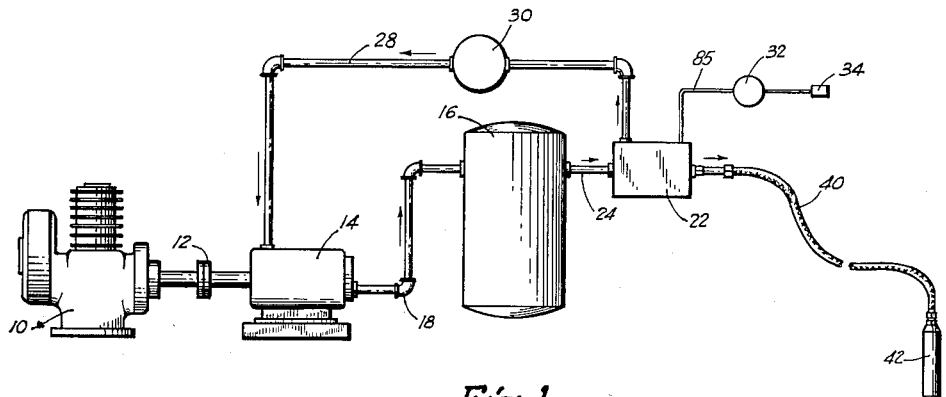
FIGURE 1 is a diagrammatic view of a hydraulic vibrating apparatus embodying the invention, and particularly depicting a single unit.

Referring to the drawings in detail, and particularly FIG. 1, a prime mover 10, such as an internal combustion engine, electric motor, or the like, is suitably coupled at 12 to a positive displacement hydraulic pump 14. The pump 14 functions to move a suitable hydraulic fluid from a suitable source (not shown) through a conduit member 18 into a receiving container or accumulator tank 16. The tank 16 is in communication with the pressure inlet 20 (FIG. 3) of a suitable servo valve member 22 through a conduit member 24. The pressure return port 26 of the valve 22 is suitably connected with the suction side of the pump 14 by means of the return conduit 28. A cooling device 30 (FIG. 1) is preferably interposed in the conduit 28 to cool the hydraulic fluid returning from the servo valve 22 to the pump 14. The cooling member 30 may be any suitable air or water type cooling device, as desired. The servo valve 22 is electrically energized for operation to direct the hydraulic fluid therethrough by means of a suitable electric oscillator member 32 which is supplied with electrical current from a small motor, or battery 34, or the like. The outlet ports 36 and 38 (FIG. 3) of the servo valve 22 are in communication with a flexible conduit member 40, as will be hereinafter set forth. A substantially cylindrical vibrating head member 42 is suitably secured to the outer extremity of the conduit or hose member 400. The conduit 40 and head 42 are filled with hydraulic fluid to provide a static fluid column whereby the fluid discharged from the outlet ports 36 and 38 will impinge thereagainst to produce hydraulic pulsations in the fluid column for vibrating the conduit 40 and head 42.

Hydraulic fluid is moved or pumped into the tank 16 by the pump 14 in any well known manner (not shown). The servo valve 22 operates in a manner as will be hereinafter set forth to move the fluid from the tank 16 to the valve. The valve 22 functions to discharge the fluid into the conduit 40 alternately through the outlet ports 36 and 38, and also functions to return the hydraulic fluid to the pump 14 through the return conduit 28 and cooling unit 30. In this manner, the hydraulic fluid may be recirculated to the accumulator tank 16 by the pump 14 for recycling through the valve 22.

Referring now to FIG. 3, the servo valve 22 comprises a housing portion 44 having an internal bore 46 for receiving a reciprocal control piston or plunger member 48. A passageway 50 extends from the central portion of the bore 46 to the inlet or pressure port 20 to provide communication therebetween. A pair of outlet passageways 52 and 54 are preferably equally spaced from the passageway 50 and extend from the bore 46 to the outlet ports 36 and 38, respectively, for providing communication between the bore 46 and the outlet ports. A return passageway 56 provides communication between the return port 26 and the bore 46 through a pair of spaced bores 58 and 60. The piston member 48 is provided with a pair of opposed end land members 62 and 64 and a central land member 66 for controlling the flow of fluid through the valve 22 as will be hereinafter set forth.

The opposed ends 68 and 70 of the bore 46 are in communication with a passageway 72 which provides for a continuous flow of fluid within the valve 22 for operation thereof. A plurality of suitable filter members 74, preferably made of sintured bronze, are provided within the passageway 72 for filtering the fluid passing therethrough to assure an efficient operation of the valve 22. An enlarged vertical chamber 76 is provided in communication with the passageway 72 through a pair of oppositely disposed passageways 73 and 75 for receiving a suitable flapper or oscillating member 78. A pair of opposed nozzle members 80 and 82 extend into the chamber 76 for directing fluid therefrom into the passageway 72. The flapper member 78 extends downwardly within the chamber 76 and is disposed between the nozzle members 80 and 82 for a purpose as will be hereinafter set forth. The flapper member 78 is mechanically connected with a suitable electric motor 84 which is electrically energized by the electric oscillator member 32 through the electric connection members 85 in any suitable manner (not shown) for oscillation of the member 78 between the nozzle members 80 and 82. In this manner the member 78 is brought into physical contact with the nozzle members in a manner for directing the flow of fluid from the chamber 76 through the passageway 72 alternately to the ends 68 and 70 of the central bore 46. The chamber 76 is in communication with the return passageway 56 through a suitable bore 86, thereby assuring a constant supply of fluid for the chamber 76 during operation of the valve 22. A pair of opposed return spring members 88 and 90 are disposed in the central bore 46 adjacent the opposed ends 62 and 64, respectively, of the plunger member 48 for fascilitating the reciprocation of the plunger.

*Servo valve operation*

When the valve 22 is in operation, hydraulic fluid moves from the accumulator tank 16 through the conduit 24 and into the inlet or pressure port 20 of the valve 22. The fluid is directed through the passageway 50 and into the bore 46. It will be apparent that in a neutral or central position of the piston member 48 as shown in FIG. 3, the position of the central land member 66 adjacent the pasageway 50 precludes the flow of fluid therefrom into the passageway 46. However, upon electrical energization of the flapper member 78 by the oscillator member 32, the member 78 will oscillate back and forth between the nozzle members 80 and 82. In one position the flapper 78 will be moved adjacent the nozzle 82, whereby fluid will be moved into the passageway 75 and withdrawn from the passageway 73. The withdrawal of fluid from the passageway 73 causes a decrease in fluid pressure in the return passageway 72 and at the end 68 of the bore 46 adjacent the end 62 of the piston member 48. Simultaneously, the fluid pressure will be increased in the end 70 of the bore 46 adjacent the end 64 of the piston member 48. The pressure differential acting on the opposed ends of the piston will cause the piston 48 to move toward a left hand position within the bore 46 as viewed in the drawings. In a left hand position for the piston 48, communication is established between the inlet pressure bore 50 and the right hand outlet bore 54, thereby discharging fluid through the outlet port 38. Simultaneously, communication is established between the left hand outlet passageway 52 and the bore 58 whereby fluid will be directed from the left hand outlet port 36 to return port 26.

The oscillation of the flapper 78 will then move the flapper away from the nozzle 82 and into physical contact with the nozzle 80, whereupon fluid will be moved into the passageway 73 and withdrawn from the passageway 75. The fluid pressure in the passageway 73 will thus be increased, and the pressure in the passageway 75 will be decreased, thereby causing a reversal of the pressure differentials acting on the piston 48 and moving it toward a right hand direction as viewed in the drawings. In a right hand position for the piston 48 (FIG. 3), communication will be established between the pressure passageway 50 and the left hand outlet passageway 52 for discharging fluid through the left hand outlet port 36. Simultaneously, the passageway 54 will be in communication with the bore 60, thereby providing communication between the right hand outlet port 38 and the return port 26 through the return passageway 56. It will be apparent that fluid will be discharged from the valve 22 alternately through the outlet ports 36 and 38 upon reciprocation of the plunger member 48 within the bore 46. The rate of speed of the reciprocal movement of the plunger 48 is determined by the rate of oscillation of the flapper member 78 between the nozzles 80 and 82. The oscillation of the flapper member 78 is controlled by the operation of the motor 84 by the oscillator member 32, which may be adjusted or set as desired for substantially any predetermined frequency of oscillation for the flapper member 78.

As fluid is discharged through the outlet port 38, fluid pressure is simultaneously relieved from the outlet port 36 through the return port 26, as hereinbefore set forth. Similarly, when fluid is discharged through the outlet port 36, fluid pressure is simultaneously relieved from the outlet portion 38 through the return port 26. Thus, the hydraulic fluid may be recirculated through the valve 22 and back to the pump 14 for recycling through the valve 22 for operation thereof.

*Vibrating elements*

Referring now to FIG. 4, the conduit or hose member 40 is preferably an elongated flexible tubular member having a suitable Y-shaped fitting member 92 provided at one end thereof. The fitting member 92 is provided with spaced inlet port members 94 and 95 adapted to be secured to the valve 22 in alignment with the outlet ports 36 and 38, respectively. The vibrating head member 42 is suitably secured to the opposite end of the conduit member 40. The vibrating head member 42 is substantially tubular in configuration, and is closed at one end thereof by a substantially spherical end portion 98. The conduit 40 and head member 42 are preferably filled with hydraulic fluid to provide a substantially static condition therein as hereinbefore set forth. Thus, upon operation of the valve 22, the fluid discharging alternately from the outlet ports 36 and 38 impinges against the upper surface (not shown) of the fluid column within the conduit 40 and produces an impulse therein. The impulse is transformed into vibrations by the fluid column such that the entire conduit 40 and vibrating head member 42 are caused to vibrate. The rate of frequency of the alternating fluid discharge from the ports 36 and 38 establishes the rate of frequency of the vibrations of the hose 40 and head 42. It will be apparent that the fitting member 92 in communication with both the outlet ports 36 and 38 provides for a vibration frequency for the conduit 40 and vibrating head member 42 double that which would be possible with a single type connection member wherein fluid flow would be directed to the conduit through only one outlet port.

As an illustration of the practice of the invention, and not to be understood in any restrictive sense, the servo valve 22 is actuated at approximately 167 cycles per second. The conduits 94 and 95 are also filled with fluid so that as the servo valve operates, there is relatively no flow of fluid in the conduits 94 and 95, but rather only intermittent pulsations in the conduits that are caused by the intermittent connection of the inlet passage 50 to the respective outlet passages 36 and 38. It can be seen that at the speed of operation of the valve there can be relatively no flow of fluid in the conduits 94 and 95, but instead only a transmission of abrupt pressure changes in the fluid column which in turn is translated into mechanical vibrations by the conduits 92 and the member 42.

A slightly modified conduit member 100 is depicted in FIG. 5. The hose 100 is preferably a flexible tubular member provided with a longitudinal partition member 102 extending substantially throughout the length thereof. The partition 102 provides two longitudinal cell portions 104 and 106 extending throughout the length of the conduit 100. A suitable dual connection member 108 is provided at the upper end of the conduit 100, as viewed in FIG. 5, for connection with the outlet ports 36 and 38 of the servo valve 22. The vibrating head 42 is suitably secured to the opposite end of the conduit 100 in the manner as set forth in the preferred embodiment. The cells 102 and 104, as well as the head member 42, are filled with hydraulic fluid to provide a substantially static condition therein. Thus, the hydraulic fluid discharging alternately from the outlet ports 36 and 38 will impinge against the fluid columns in the cells 102 and 104 to create impulses therealong for providing a vibration for the conduit 100 and head member 42. It will be apparent that the vibration frequency of the hose 100 and head 42 will be determined by the rate of frequency of the alternate discharge of fluid from the outlet ports 36 and 38 as hereinbefore set forth.

A further modified conduit member 110 is shown in FIG. 6. The conduit 110 is similar in configuration to the conduit 40 of the preferred embodiment, and is provided with a Y-shaped fitting member 112 similar to the fitting 92. However, dual hose members 114 and 116 are suitably connected to the outlet ports 36 and 38, respectively, and extend downwardly within the fitting member 112 and throughout the length of the hose member 110. A modified vibrating head member 118 is suitably secured to the lowermost end of the hose 110, as viewed in FIG. 6. The head member 118 comprises a substantially cylindrical housing portion 120 closed at the lowermost end thereof by a suitable arcuate cap member 122. An apertured plate member 124 is welded or the like (not shown) at the uppermost end of the head member 118 for receiving the outer extremity of the dual hose members 114 and 116, as clearly shown in the drawings. A flexible diaphragm member 126 is centrally disposed within the head member 118 and extends longitudinally therein from the plate member 124 to the bottom member 122, thereby providing two longitudinal compartments or chambers 128 and 130 within the head member 118. Suitable weight members 132 are suitably secured to the diaphragm 126 for a purpose as will be hereinafter set forth.

The discharge of hydraulic fluid through the outlet port 38 of the valve 22 directs the fluid into the hose member 116. When the those member 116 is substantially filled with hydraulic fluid, the impinging of the hydraulic fluid entering the hose 116 will impart an impulse to the fluid column therein, and increase the fluid pressure within the chamber 130, thereby increasing the fluid pressure acting on the right hand side of the diaphragm 126. The increased pressure and weight member 132 will cause the diaphragm member 126 to flex in a left hand direction, thereby imparting a vibration to the head 118. Simultaneously with the discharge of fluid through the outlet port 38, fluid will flow out of the hose 114 and through the outlet port 36 into the return outlet 26, thereby causing a reduction of pressure within the chamber 128. The reduction of pressure within the chamber 128, and therefore on the left hand side of the diaphragm 126, facilitates the left hand flexing of the diaphragm 126 (FIG. 6). Similarly, a reversal of the flow of fluid into the dual hose members 114 and 116 will cause the diaphragm to flex in a right hand direction, thereby imparting vibration to the vibrating head member 118. It will be apparent that the vibration frequency is directly related to the frequency of fluid discharge alternately through the outlet ports 36 and 38.

*Operation*

By way of summary of operation, the prime mover 10 functions to drive the positive displacement pump 14 for directing hydraulic fluid from a suitable reservoir or source (not shown) into the accumulator tank 16. The servo valve 22 is operated or electrically energized for operation by the electric oscillator member 32. The servo valve discharges fluid alternately through the outlet ports 36 and 38, and also recirculates the hydraulic fluid through the return line 28 back to the pump 14 for a recycling of the fluid. The conduit member 40 is in communication with the outlet ports 36 and 38 of the valve 22, and is filled with the hydraulic fluid to establish a substantially static condition within the conduit 40 and vibrating head member 42. Thus, the vibrating head member and hose many be utilized in any suitable manner for any suitable purpose, such as compacting concrete and other uses where a vibration is needed. The frequency of the vibration of the hose and vibrating head is determined by the frequency of the alternate discharge of fluid from the outlet ports 36 and 38. The rate of speed of the reciprocation of the piston member 48 of the servo valve 22 determines or controls the frequency of the alternation of discharge from the outlet ports, and the rate of speed of reciprocation of the piston member 48 is in turn controlled by the oscillation of the flapper member 78. The oscillator member 32 may be adjusted to provide substantially any desired frequency of oscillation for the flapper member 78.

*Multiple adaptation*

Figure 2:
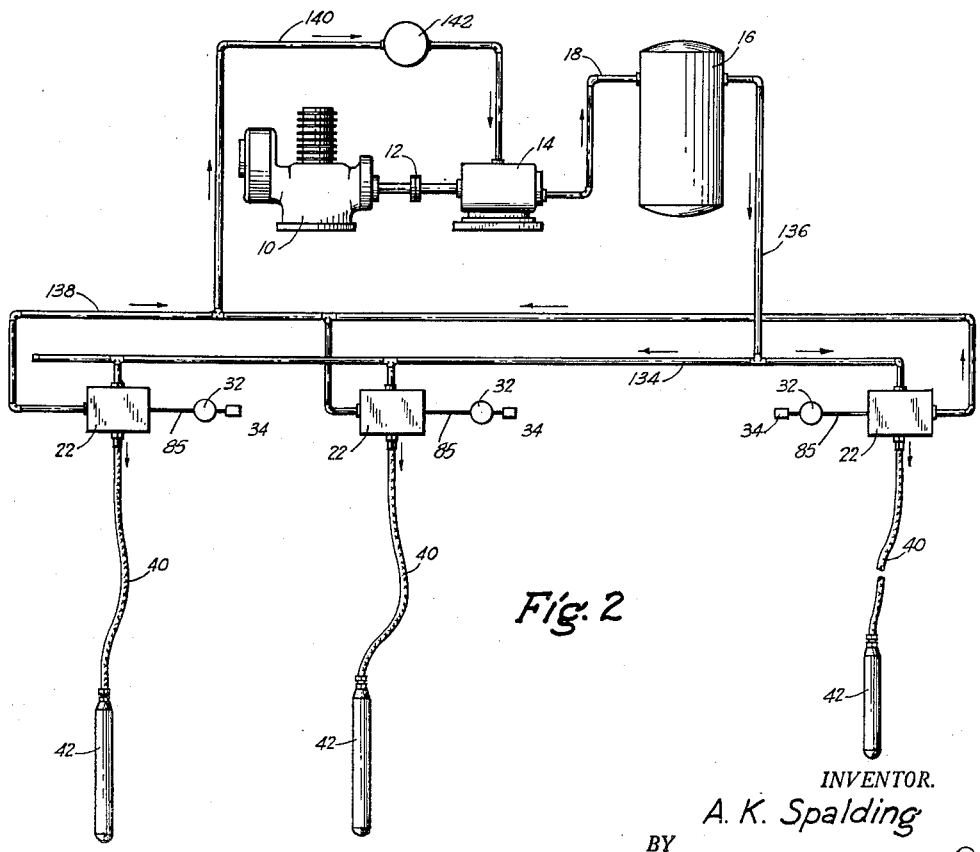
FIGURE 2 is a view similar to FIG. 1 and depicts a multiple type unit.

FIGURE 2 depicts an arrangement wherein a plurality of vibrating conduits 40 and vibrating head members 42 may be operated from the engine 10. A plurality of servo valve members 22 may be connected together by a suitable conduit 134 which directs hydraulic fluid to the inlet port 20 of the valves for operation thereof as hereinbefore set forth. Each of the valves 22 is provided with an oscillator 32 and motor 34 for operation thereof as previously set forth. The accumulator tank 16 is in communication with the main conduit 134 through a supply line 136 for directing fluid from the tank into the valves 22. The return port 26 of each of the valves 22 is suitably connected with a common return line 138 which is in turn in communication with a conduit 140 which directs the returning hydraulic fluid back into the suction side of the pump 14, as hereinbefore set forth. A suitable cooling device 142, similar to the cooler 30, is interposed in the line 140 for cooling the returning hydraulic fluid prior to discharge thereof into the pump 14 for recycling through the valve 22. In this manner, hydraulic fluid may be supplied to a plurality of servo valves 22 for discharge therefrom into the complementary conduits 40 secured thereto. Thus, a plurality of vibrating conduits and vibrating head members may be operated from a single prime mover and pump installation.

From the foregoing, it will be apparent that the present invention provides an improved and novel hydraulic vibrating apparatus wherein impulses are imparted to a hydraulic fluid column for producing vibrations in a conduit and vibrating head member. The vibration of the conduit and head are produced entirely by hydraulic impact wherein substantially all the revolving parts usually required in a vibrating head are eliminated. It will be apparent that the hydraulic method of vibrating or creating vibrations may be utilized for creating vibration in the bottom of an oil well bore in the proximity of the oil pool for setting up the necessary vibrations in the pores of the adjacent strata, thereby effecting a fracturing effect in the strata for freeing the oil. The vibration method may also be incorporated in highway building equipment of all kinds, and particularly in compaction equipment often used in laying road beds, and the like. The unique application of hydraulic pressure for producing vibrations provides a simple and efficient vibrating apparatus which is economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A method of creating vibrations consisting of directing the flow of a hydraulic fluid into intermittent contact with a fluid column for producing intermittent hydraulic pressure throughout the length of the fluid column, controlling the rate of frequency of the intermittent flow of the hydraulic fluid, translating the intermittent hydraulic pressures into mechanical vibrations, and recirculating the hydraulic fluid into contact with the fluid column for a continuous cycle.

2. A system for hydraulically producing mechanical vibrations, and comprising a prime mover, a pump operably connected with the prime mover for actuation thereby, a servo valve in communication with the pump for receiving a hydraulic fluid, electrical means for selective operation of the servo valve, a flexible conduit member secured to the valve for receiving the hydraulic fluid intermittently therefrom, a fluid column within the conduit member receiving the intermittent flow of fluid thereby providing intermittent hydraulic pressures throughout the fluid column and causing mechanical vibration of the conduit member, and means for recirculating the hydraulic fluid through the pump and valve for a continuous vibration of the conduit member.

3. A system for hydraulically producing mechanical vibrations, and comprising a prime mover, a pump operably connected with the prime mover for actuation thereby, a servo valve in communication with the pump for receiving a hydraulic fluid, a conduit member in communication with the valve and having a hydraulic fluid column therein, electric oscillator means for operating said valve for intermittently discharging the hydraulic fluid therefrom and into contact with the fluid column, said fluid column translating the intermittent flow of hydraulic fluid into hydraulic impulses for mechanically vibrating the conduit member, and means for recirculating the hydraulic fluid through the pump and valve for a continuous vibration of the conduit member.

4. An apparatus for producing mechanical vibrations, and comprising a prime mover, a pump operably connected with the prime mover for actuation thereby, a servo valve in communication with the pump for receiving a hydraulic fluid, a conduit member in communication with the valve, a tubular head member secured to the outer extremity of the conduit member, said conduit and head member filled with the hydraulic fluid to provide a fluid column therein, means for operating said valve whereby the hydraulic fluid is intermittently discharged therefrom into physical contact with the fluid column, said fluid column providing hydraulic impulses whereby hydraulic pressure is transmitted through the fluid column to cause vibration of the conduit and head members, and means for recirculating the hydraulic fluid through the pump and valve for a continuous vibration of the conduit and head members.

5. In a hydraulic vibrating apparatus, a flexible conduit member having dual longitudinal chambers therein, a tubular head member secured to the conduit member, said head member having one end closed, an apertured plate member provided at the opposite end of the head member, a flexible diaphragm member provided within the head member and extending longitudinally therein to provide dual chambers in alignment with the first mentioned dual chambers, weight means provided on the diaphragm member for facilitating flexing thereon, said aperture plate member providing communication between the aligned dual chambers of the conduit member and the head member whereby the aligned chambers cooperate to provide dual columns extending throughout the combined length of the conduit and head members, said combined dual chambers filled with a hydraulic fluid to provide dual fluid columns, means for impinging an intermittent flow of hydraulic fluid to the fluid columns whereby hydraulic impulses are imparted alternately through the fluid columns, said diaphragm member responding to the alternate hydraulic impulses for flexing within the head member to provide mechanical vibrations therefor.

6. An apparatus for producing mechanical vibrations, and comprising a prime mover, a pump operably connected with the prime mover for actuation thereby, a servo valve in communication with the pump for receiving a hydraulic fluid, a flexible conduit member having dual longitudinal chambers therein, a tubular head member having one end closed and the opposite end secured to the conduit, said conduit and head member filled with a hydraulic fluid to provide a substantially static fluid column in the head and dual chambers, said valve in communication with said conduit member whereby hydraulic fluid is impinged alternately against the dual fluid columns, said fluid columns imparting hydraulic impulses for providing a mechanical vibration of the head and conduit members, and means for regulating the rate of frequency of the hydraulic impulses.

7. In a hydraulic vibrating apparatus, a flexible conduit member having dual longitudinal chambers therein, a tubular head member having one end closed and the opposite end secured to the conduit, said conduit and head member filled with a hydraulic fluid to provide a substantially static fluid column in the head and dual chambers, means for producing hydraulic impulses alternately in the dual chambers whereby mechanical vibrations are imparted to the conduit and head member, means for regulating the rate of frequency of the hydraulic impulses, and means for recirculating the hydraulic fluid through the first mentioned means to provide for a continuous vibration of the conduit and head member.

References Cited in the file of this patent

UNITED STATES PATENTS

| | | |
|---|---|---|
| 2,080,727 | Ludeman | May 18, 1937 |
| 2,090,575 | De Motte | Aug. 17, 1937 |
| 2,187,088 | Malan | Jan. 16, 1940 |
| 2,215,888 | Swarthout | Sept. 24, 1940 |
| 2,270,586 | Jahant et al. | Jan. 20, 1942 |
| 2,298,252 | Davis | Oct. 6, 1942 |
| 2,447,312 | Burt | Aug. 17, 1948 |
| 2,472,568 | Burt | June 7, 1949 |
| 2,520,833 | Connolly et al. | Aug. 29, 1950 |
| 2,581,303 | Siimes | Jan. 1, 1952 |
| 2,597,505 | Lindkvist | May 20, 1952 |
| 2,649,843 | Province | Aug. 25, 1953 |
| 2,655,903 | Tyler | Oct. 20, 1953 |
| 2,687,189 | Schnell | Aug. 24, 1954 |
| 2,763,472 | Fontaine | Sept. 18, 1956 |
| 2,767,689 | Moog | Oct. 23, 1956 |
| 2,773,482 | Dickie | Dec. 11, 1956 |
| 2,797,666 | Chubbuck | July 2, 1957 |
| 2,869,468 | Browne | Jan. 20, 1959 |

FOREIGN PATENTS

| | | |
|---|---|---|
| 47,185 | France (4th Addition) | Nov. 7, 1936 |
| 835,760 | France | Oct. 3, 1938 |